(12) United States Patent
Yamagishi (10) Patent No.: US 8,467,732 B2
(45) Date of Patent: Jun. 18, 2013

(54) WIRELESS COMMUNICATION APPARATUS

(75) Inventor: Toshiyuki Yamagishi, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 588 days.

(21) Appl. No.: 12/717,586

(22) Filed: Mar. 4, 2010

(65) Prior Publication Data

US 2011/0053535 A1    Mar. 3, 2011

(30) Foreign Application Priority Data

Sep. 2, 2009    (JP) ................................. 2009-203131

(51) Int. Cl.
*H04B 15/00*    (2006.01)

(52) U.S. Cl.
USPC ....... 455/63.3; 455/63.4; 455/63.1; 455/67.1; 455/296; 455/307; 455/456.1; 455/118; 455/193; 455/272; 375/340; 375/78; 375/316; 375/355

(58) Field of Classification Search
USPC ........... 455/63.3, 63.1, 67.1, 296, 307, 456.1, 455/118, 193, 272; 375/340, 78, 316, 355, 375/260
See application file for complete search history.

(56) References Cited

U.S. PATENT DOCUMENTS

| | | | |
|---|---|---|---|
| 6,255,984 B1* | 7/2001 | Kreppold et al. | 342/128 |
| 7,292,656 B2* | 11/2007 | Kloper et al. | 375/340 |
| 7,496,158 B2* | 2/2009 | Fudge et al. | 375/340 |
| 7,982,661 B2* | 7/2011 | Beasley | 342/128 |
| 7,986,397 B1* | 7/2011 | Tiemann et al. | 356/5.09 |
| 2007/0135057 A1* | 6/2007 | Nallapureddy et al. | 455/67.13 |
| 2009/0061780 A1* | 3/2009 | Sekiya et al. | 455/63.1 |
| 2010/0194623 A1* | 8/2010 | Hansen | 342/52 |

FOREIGN PATENT DOCUMENTS

| | | |
|---|---|---|
| JP | 61-95602 | 5/1986 |
| JP | 61-274456 | 12/1986 |
| JP | 04-115182 | 4/1992 |
| JP | 08-288746 | 11/1996 |
| JP | 2002-196067 | 7/2002 |
| JP | 2002-328160 | 11/2002 |
| JP | 2005-241360 | 9/2005 |
| JP | 2007-132906 | 5/2007 |
| JP | 2008-014812 | 1/2008 |
| JP | 2009-049901 | 3/2009 |

OTHER PUBLICATIONS

Japanese Office Action for Japanese Application No. 2009-203131 mailed on Nov. 1, 2011.

* cited by examiner

*Primary Examiner* — Andrew Wendell
*Assistant Examiner* — Ganiyu A Hanidu
(74) *Attorney, Agent, or Firm* — Turocy & Watson, LLP (57) ABSTRACT

A wireless communication apparatus includes an analog receiving unit, a phase calculator, a time variation calculator, and a chirp radar determination unit. The analog receiving unit obtains a receiving signal from a radio wave. The phase calculator calculates a phase of the receiving signal. The time variation calculator calculates a frequency of the receiving signal based on the phase. Moreover, the time variation calculator further calculates a time variation of the frequency. The chirp radar determination unit determines whether the receiving signal is a chirp radar or not based on the time variation.

6 Claims, 11 Drawing Sheets

WIRELESS COMMUNICATION APPARATUS

CROSS REFERENCE TO RELATED APPLICATION

This application is based upon and claims the benefit of priority from the prior Japanese Patent Application No. 2009-203131, filed on Sep. 2, 2009, the entire contents of which are incorporated herein by reference.

FIELD OF THE INVENTION

The present invention relates to a wireless communication apparatus.

DESCRIPTION OF THE BACKGROUND

A wireless communication system using IEEE802.11a/n shares a frequency bandwidth of 5 GHz with radar such as a weather radar or a terrain radar. A wireless communication apparatus in the wireless communication system checks arrival of radio wave from the radar in order to avoid interference. If the wireless communication apparatus detects the radio wave from the radar in a frequency bandwidth, the wireless communication apparatus may abstain from using the frequency bandwidth. There are two radars in the 5 GHz band, that is a pulse radar and a chirp radar. A transmission time duration of the pulse radar is usually shorter than that of a frame of the wireless communication system. Accordingly, the wireless communication apparatus is able to distinguish between the pulse radar and the frame of the wireless communication system by measuring a power of a receiving wave in terms of time. On the other hand, the transmission time duration of the chirp radar is almost same as the frame of the wireless communication system. Therefore, it is difficult for the wireless communication apparatus to distinguish the chirp radar and the frame of the wireless communication system by only measuring the power of the receiving wave. In order to distinguish the chirp radar and the frame of the wireless communication system, the wireless communication apparatus may need to analyze a wave form.

A conventional wireless communication apparatus inputs the receiving radio wave into a demodulation unit of IEEE802.11a/n in order to distinguish the chirp radar and the frame of the wireless communication system. If the conventional wireless communication apparatus can not demodulate the receiving radio wave correctly in the demodulation unit, the conventional wireless communication apparatus determines that the receiving radio wave is the chirp radar.

In other conventional wireless communication apparatus, if the conventional wireless communication apparatus has a replica of a wave form of other wireless communication system (for example, HiperLAN), the conventional wireless communication apparatus calculates correlation between the receiving wave and the replica of the other wireless communication system. If the correlation is low, the conventional wireless communication apparatus determines that the receiving wave is the chirp radar.

However, the conventional wireless communication apparatus may falsely determine that the receiving wave is the chirp radar, if the conventional wireless communication apparatus receives the frame of other wireless communication system degraded severely by radio channel or an unknown frame of a new wireless communication system. For example, a green field packet of IEEE802.11n is the unknown frame for a wireless communication apparatus using IEEE802.11a. In order to reduce mistake of the determination, the wireless communication apparatus is better to measure a time variation of a frequency which is unique feature of the chirp radar.

One of the techniques for detecting the time variation of the frequency is disclosed in JP-A 2007-166611 (KOKAI). In this reference, a wireless communication apparatus estimates frequency of the radio wave by counting number of zero crosses of the radar wave for a duration. The wireless communication apparatus estimates the frequency of the radio wave in each of continuous three periods. If the frequency of the radio wave varies linear, the wireless communication apparatus determines that the receiving radio wave is the chirp radar. However, the wireless communication apparatus may falsely determine, if at least one of the estimated frequency includes a large error.

Accordingly, an advantage of an aspect of the present invention is to provide a wireless communication apparatus which detects the chirp radar more certainly.

SUMMARY OF THE INVENTION

According to one aspect of the invention, a wireless communication apparatus includes an analog receiving unit for obtaining a receiving signal from a radio wave;

a phase calculator for calculating a phase of the receiving signal;

a time variation calculator for calculating a frequency of the receiving signal based on the phase and calculating a time variation of the frequency; and a chirp radar determination unit for determining whether the receiving signal is a chirp radar or not based on the time variation.

DETAILED DESCRIPTION OF THE INVENTION

The embodiment will be explained with reference to the accompanying drawings.

Description of the First Embodiment

First, we will explain a signal wave of a chirp radar. In a top of FIG. 1, a waveform of the chirp radar is shown. In a middle of FIG. 1, a time variation of power of the chirp radar is shown. In a bottom of FIG. 1, a time variation of frequency of the chirp radar is shown.

Figure 1:
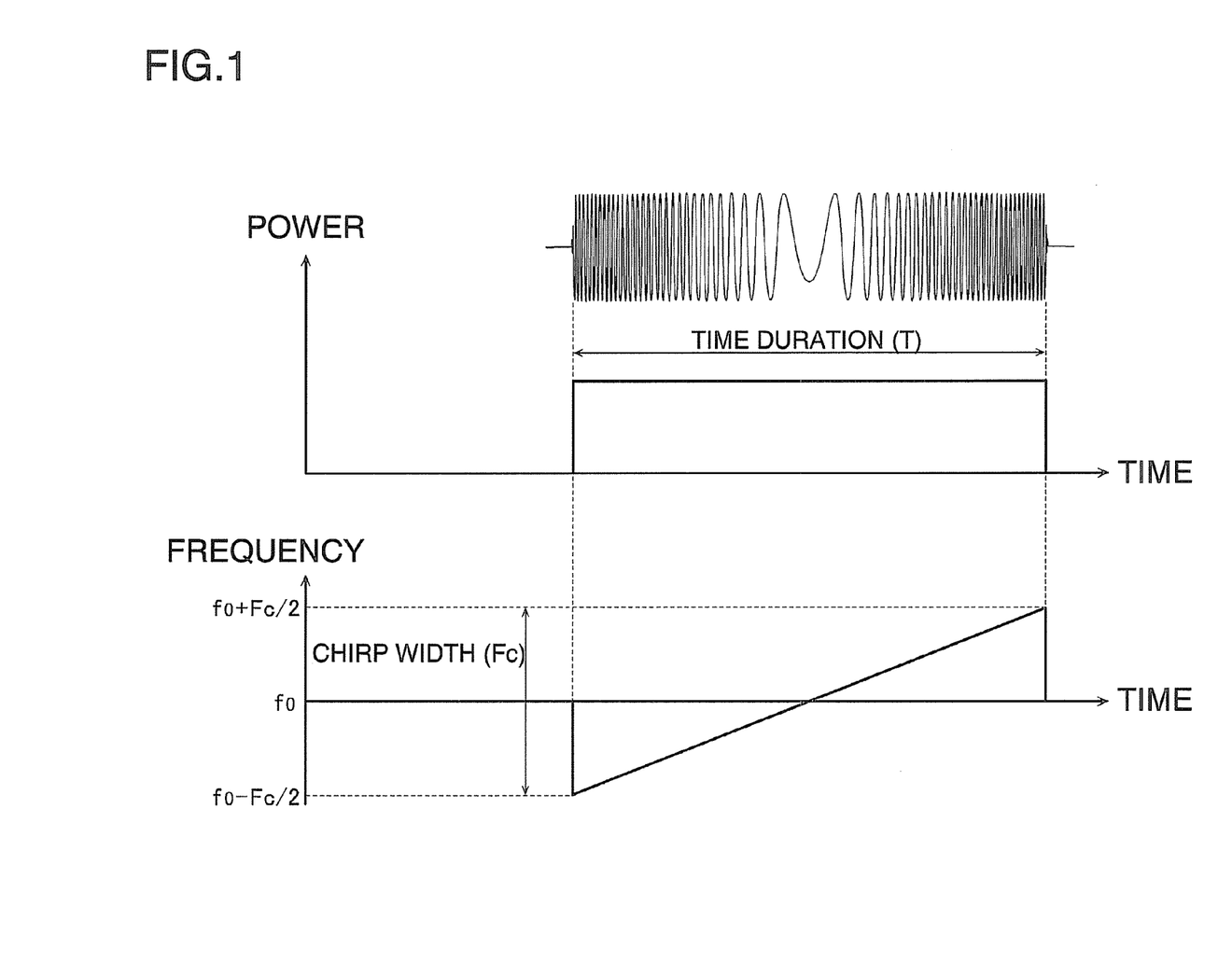
FIG. 1 is a figure explaining a signal wave of a chirp radar.

As shown in FIG. 1, the waveform of the chirp radar (hereinafter, referred to as "chirp wave") always varies the frequency. Time duration in which power of the chirp radar exists is defined as time duration T. Difference between the frequency when the chirp wave starts and the frequency when the chirp wave ends is defined as a chirp width Fc [frequency]. A chirp radar of which the frequency varies linearly with time is called a linear chirp wave. Most of the chirp radar has the linear chirp wave. The chirp wave is following the expression (1).

$$A_{(t)} = A_0 \exp\left[i\left\{\frac{FC}{2T}\left(t - \frac{T}{2}\right)^2 + f_0 t\right\}\right] \quad (0 \leq t \leq T) \quad (1)$$

According to the expression (1), $A_0$ is amplitude of the chirp wave, Fc is the chirp width, T is time duration, $f_0$ is a central frequency, and t is time. Phase $\phi$ [rad] and frequency f [MHz] of the waveform is following the expression (2). According to the expression (2), they are variable with time t [us], respectively.

$$\phi_{(t)} = 2\pi\left\{\frac{Fc}{2T}\left(t - \frac{T}{2}\right)^2 + f_0 t\right\} \quad (2)$$

$$f_{(t)} = \frac{Fc}{t}\left(t - \frac{T}{2}\right) + f_0$$

Time variation of the frequency is following the expression (3).

$$\frac{df}{dt} = \frac{Fc}{T} \quad (3)$$

The value of the expression (3) is constant and independent on the time t. This means that the frequency of the chirp wave varies linearly with time. The wireless communication apparatus of the first embodiment detects the chirp radar which has the chirp wave described above.

Hereinafter, we will explain the wireless communication apparatus of the first embodiment.

Figure 2:
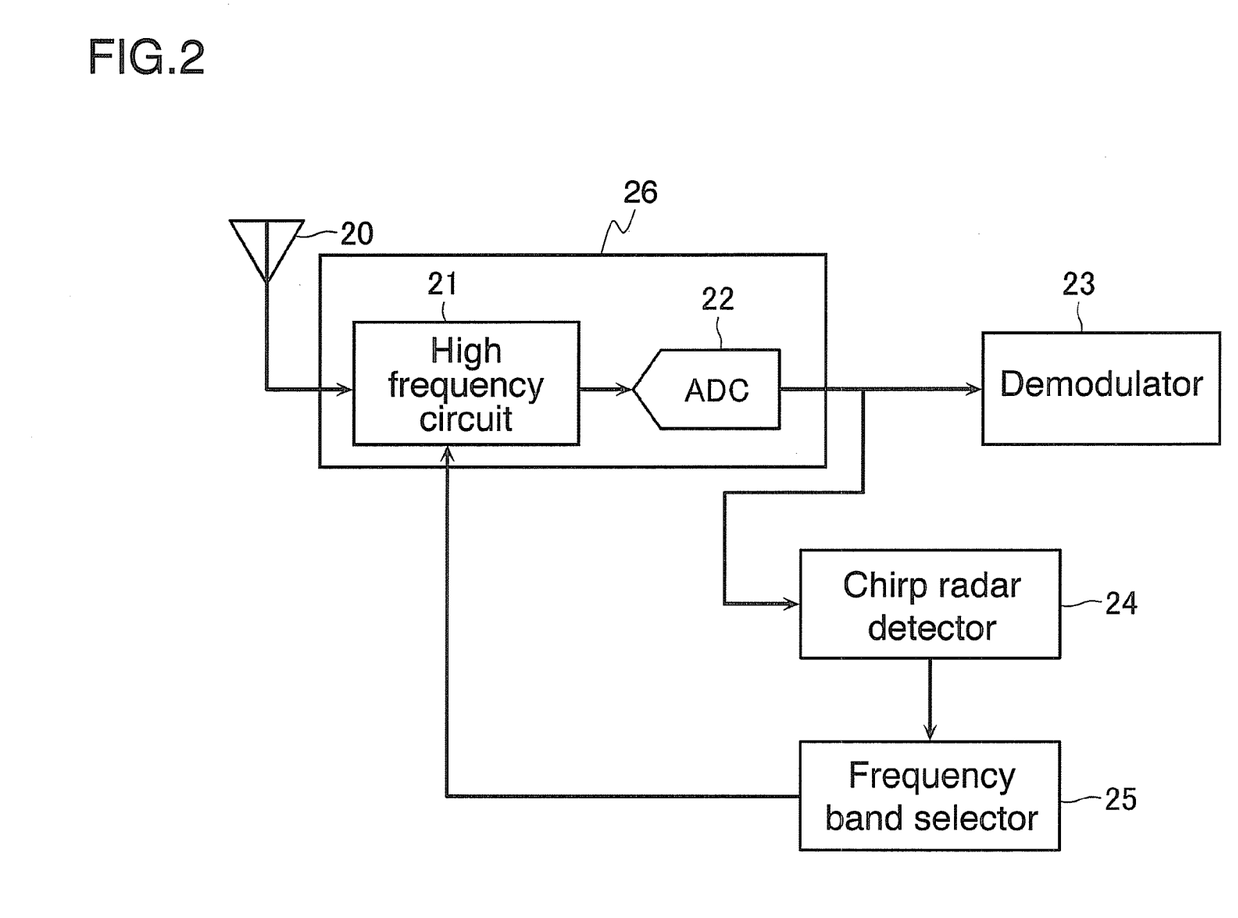
FIG. 2 is a block diagram showing a wireless communication apparatus according to the first embodiment.

As shown in FIG. 2, the wireless communication apparatus includes an antenna 20, an analog receiving unit 26, a demodulator 23, a chirp radar detector 24, and a frequency band selector 25. The analog receiving unit 26 includes a high frequency circuit 21 and an analog to digital convertor (ADC) 22.

The antenna 20 receives a radio wave. The high frequency circuit 21 down-converts the radio wave to an analog baseband signal. The analog to digital convertor 22 converts the analog baseband signal to a digital baseband signal. Then, the demodulator 23 demodulates the digital baseband signal.

The chirp radar detector 24 starts to operate when the digital baseband signal is input from the analog to digital convertor 22. In the first embodiment, the radio communication apparatus performs a digital quadrature detection. Specifically, the high frequency circuit 21 obtains a cosine wave and a sine wave from the radio wave. The phase of the sine wave is sifted by 90-degree to the phase of the cosine wave. Then, the high frequency circuit 21 outputs the sine and cosine waves to the analog to digital convertor 22. The cosine wave is called as In-Phase Channel (Ich). Similarly, the sine wave is called as Quadrature channel (Qch). The analog to digital convertor 22 converts the In-Phase Channel (Ich) and the Quadrature channel (Qch) to the digital signals, respectively. Moreover, the analog to digital convertor 22 forms a complex number from the digital signals. A real part of the complex number shows the In-Phase Channel (Ich). An imaginary part of the complex number shows the Quadrature channel (Qch). The analog to digital convertor 22 outputs the complex number to the demodulator 23 and the chirp radar detector 24.

The chirp radar detector 24 determines whether the receiving signal is the chirp wave or not (described later). If the chirp radar detector 24 determines that the receiving signal is the chirp wave, the chirp radar detector 24 outputs a notification meaning detection of the chirp radar (hereinafter, referred to "chirp notification") to the frequency band selector 25.

If the frequency band selector 25 receives the chirp notification from the chirp radar detector 24, the frequency band selector 25 controls the high frequency circuit 21 in order to abstain from using the frequency band as that the chirp radar uses the frequency band. Moreover, the frequency band selector 25 controls the high frequency circuit 21 in order to move to other frequency band and continue the communication. Specifically, the frequency band selector 25 selects a new frequency band from frequency bands except the frequency band used currently. Then, the frequency band selector 25 sends an indication to the high frequency circuit 21 in order to use the new frequency band for the wireless communication.

Next, we will describe detail of the chirp radar detector 24.

Figure 3:
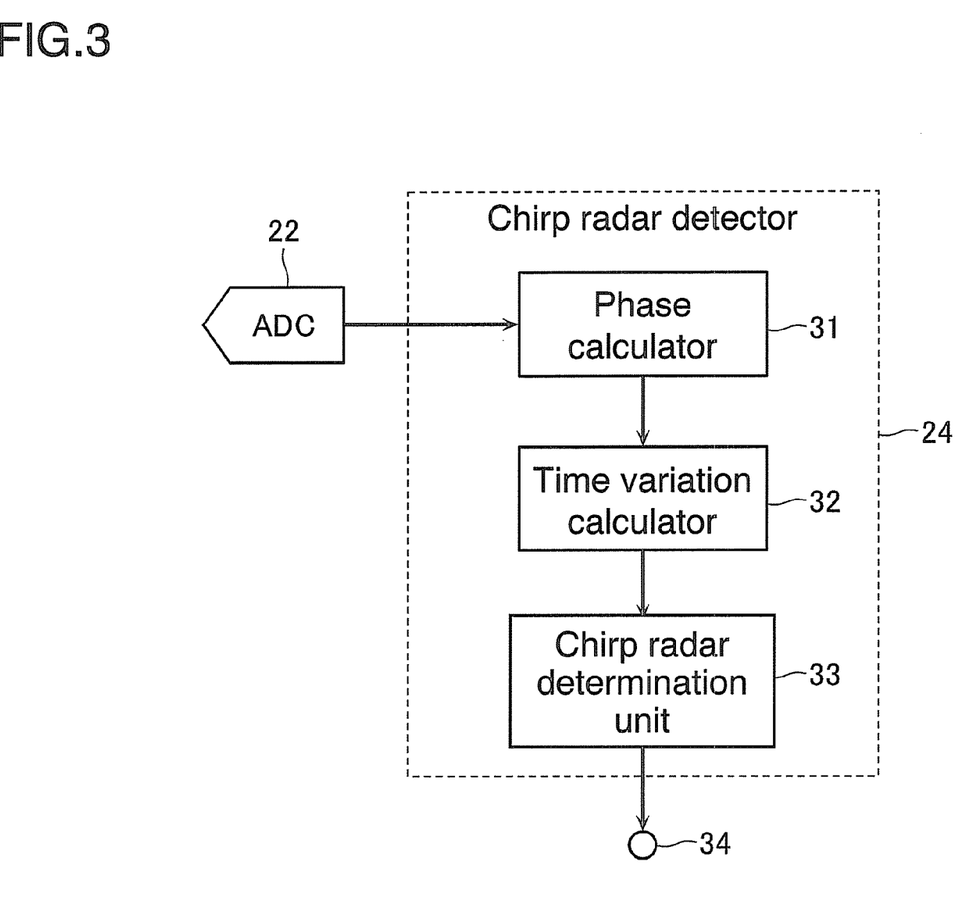
FIG. 3 is a block diagram showing a chirp radar detector of the wireless communication apparatus shown in FIG. 2.

As shown in FIG. 3, the chirp radar detector 24 includes a phase calculator 31, a time variation calculator 32, and a chirp radar determination unit 33. The phase calculator 31 calculates phase of the receiving wave. The time variation calculator 32 calculates time variation of the frequency of the chirp wave. The chirp radar determination unit 33 determines whether the receiving signal is the chirp wave or not.

The analog to digital convertor 22 outputs the complex number to the phase calculator 31 of the chirp radar detector 24. The phase calculator 31 calculates phase of the receiving radio based on the complex number and outputs the phase to the time variation calculator 32. The time variation calculator 32 calculates time variation of the frequency of the receiving wave based on the phase. The chirp radar determination unit 33 obtains the time variations from the time variation calculator 32 several times. Then, the chirp radar determination unit 33 determines whether the receiving signal is the chirp wave or not based on the several time variations. If the chirp radar determination unit 33 determines that the receiving signal is the chirp wave, the chirp radar detector 24 outputs the chirp notification from an output terminal 34.

Operation of the chirp radar detector 24 is described below.

The phase calculator 31 calculates the phase of the receiving radio based on the complex number inputted by the analog to digital convertor 22. Explain of the detail to calculate the phase is skipped because it is same as conventional methods. In one conventional method, ratio of the In-Phase Channel (Ich) and the Quadrature channel (Qch) is calculated. Then, the phase is mapped in a range between 0 [rad] and $2\pi$ [rad] based on an arctangent due to the In-Phase Channel (Ich) and the Quadrature channel (Qch).

Figure 4:
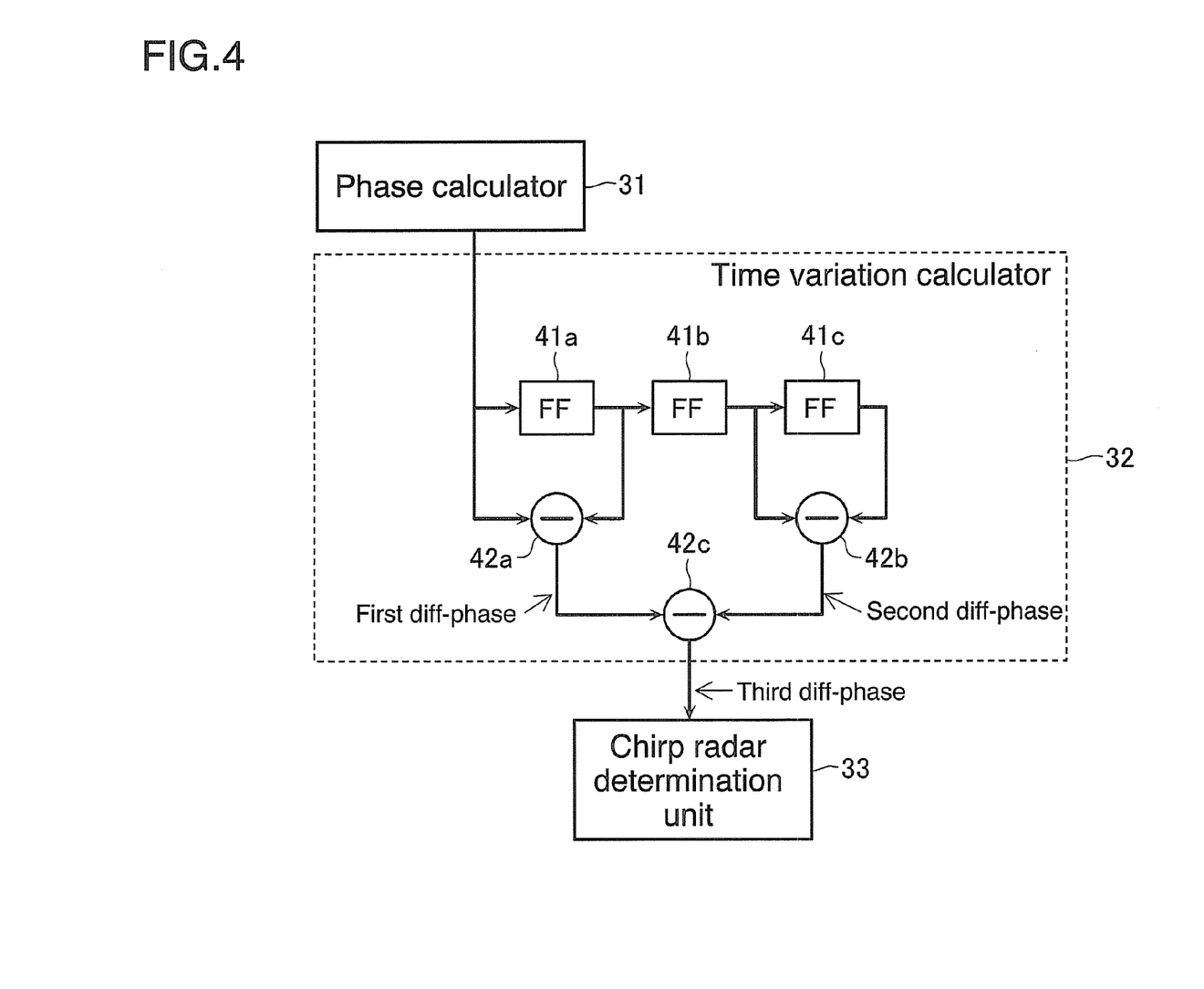
FIG. 4 is a block diagram showing a time variation calculator of the chirp radar detector shown in FIG. 3.

As shown in FIG. 4, the time variation calculator 32 includes delay flip-flops (FF) 41a-41c and subtractors 42a-42c.

The phase of the receiving radio is inputted into the flip-flop 41a from the phase calculator 31. The flip-flop 41a outputs the phase to the flip-flop 41b and the subtractor 42a after certain clocks have passed. The flip-flop 41b outputs the phase to the flip-flop 41c and the subtractor 42b after certain clocks have passed. The flip-flop 41c outputs the phase to the subtractor 42b after certain clocks have passed.

The subtractors 42a, 42b are used to calculate the frequency of the receiving radio wave based on the phase. The subtractor 42a subtracts the phase inputted by the flip-flop 41a from the phase inputted by the phase calculator 31 to obtain a first diff-phase. The first diff-phase shows the time variation of the phase during a delay time in the flip-flop 41a. The delay time may be several clocks. The first diff-phase is proportional to the frequency. Similarly, the subtractor 42b subtracts the phase inputted by the flip-flop 41b from the phase inputted by the flip-flop 41c to obtain a second diff-phase. The second diff-phase shows the time variation of the phase during the delay time in the flip-flop 41c. The second diff-phase is proportional to the frequency.

We explain an example below. In the example, the phase from the phase calculator 31 is 0 [rad], the phase from the flip-flop 41a is $\pi/16$ [rad], the phase from the flip-flop 41b is $\pi/8$ [rad], and the phase from the flip-flop 41c is $\pi/4$ [rad]. The delay time in each of the flip-flop 41a-41c is 1 [µs]. In this case, the subtractor 42a outputs $-\pi/16$ [rad]. This means the phase varies $-\pi/16$ [rad] during 1 [µs]. It corresponds to a frequency of $-31.25$ [kHz]. Similarly, the subtractor 42b outputs $-\pi/8$ [rad]. It corresponds to a frequency of $-62.5$ [kHz].

The subtractor 42c is used to calculate the time variation of the frequency based on the first and second diff-phases. If the delay time of the flip-flop 41a equals to the delay time of the flip-flop 41c, the first and second diff-phases are due to the same delay time as a unit time. The subtractor 42c subtracts the second diff-phase from the first diff-phase to obtain a third diff-phase. The third diff-phase shows the time variation of the frequency during the delay time of the flip-flop 41a and the delay time of the flip-flop 41b. Sum of the delay time of the flip-flop 41a and the delay time of the flip-flop 41b is equal to sum of the delay time of the flip-flop 41b and the delay time of the flip-flop 41c.

In the above example, the subtractor 42c outputs $\pi/16$ [rad], because $-\pi/16-(-\pi/8)=\pi/16$ [rad]. This means the frequency varies 31.25[kHz] during 2 [µs]. It corresponds to a frequency of 15.625 [kHz/µs]. As a result, the time variation calculator 32 obtains the time variation of the frequency based on the phase from the phase calculator 31.

However, the time variation calculator 32 does not distinguish between 0 [rad] and $2\pi$ [rad]. For example, when the time variation of the frequency of the receiving radio is 0 [Hz/µs], the time variation calculator 32 outputs 0 [rad]. Also, when the time variation of the frequency of the chirp radar wave is 500 [kHz/µs], the time variation calculator 32 outputs 0 [rad]. Accordingly, when the chirp radar determination unit 33 receives "0 [rad]" from the time variation calculator 32, the chirp radar determination unit 33 may not distinguish a case of no time variation of the frequency and a case of the time variation of the frequency of 500 [kHz/µs]. As a result, the chirp radar determination unit 33 may fail to detect the chirp radar.

To avoid failing to detect, the chirp radar detector 24 previously obtains the range of the time variation in the chirp radar. Then, the delay times of the flip-flops 41a-41c are adjusted as that the range does not overlap 0 [Hz/µs]. For example, a frequency band W56 (5.47 [GHz]~5.725 [GHz]) is shared by a wireless LAN using IEEE802.11a/n and a chirp radar. The chirp radar in the frequency band W56 has the time width of 50~100 [µs] and the chirp width of 5~20 [MHz]. Therefore, the time variation of the frequency is 50~400 [kHz/µs]. If the delay time of each of the flip-flops 41a-41c is 1 [µs], the time variation of the frequency of 0 [Hz/µs] is 500 [kHz/µs]. By setting the delay times of the flip-flops 41a-41c above, it becomes low probability that the time variation of the frequency is regarded as 0 [Hz/µs].

The delay times of the flip-flop 41a-41c is following the expression (4). In the expression (4), the time variation of the frequency is D [MHz/µs]. The time variation D of the frequency is calculated by dividing the chirp width Fc [MHz] by the time width T [µs] (That is Fc/T in the expression (3)). The delay time of the flip-flop 41a and the delay time of the flip-flop 41c are set to be same. The delay time of the flip-flop 41a and the delay time of the flip-flop 41c are expressed as Ta [µs]. The delay time of the flip-flop 41b is expressed as Tb [µs]. The time variation of the frequency as shown in the expression (4) is calculated from the expression (2) under ideal environment with no noise.

$$\phi_{(ts)}-\phi_{(ts+Ta)}-\{\phi_{(ts+Ta+Tb)}-\phi_{(ts+2Ta+Tb)}\}=2\pi DTa(Ta+Tb) \text{ [rad]} \quad (4)$$

A timing of sampling ts [µs] does not appear in the expression (4). A minimum time variation of the frequency is expressed as Dmin [MHz/µs] and the maximum time variation of the frequency is expressed as Dmax [MHz/µs]. The Dmin and Dmax are following the expression (5).

$$0 < D\min Ta(Ta+Tb)$$

$$1 > D\max Ta(Ta+Tb) \quad (5)$$

Since noise and channel cause variation in actual environments, the expression (5) needs a margin.

Moreover, the delay time of the flip-flop depends on a delay spread due to multi-pass in the wireless communication environments. The radio wave from the chirp radar reaches to the receiving antenna of the wireless communication apparatus with having reflected and diffracted. Therefore, several paths exit from the chirp radar to the receiving antenna of the wireless communication apparatus. The delay spread shows variation of arrival times for every path.

The wireless communication environments including multi-paths are expressed depending on the frequency. A radio wave arrives at the receiving antenna with adding amplitude of "A" times and a rotation of phase $\theta$ to a transmitted radio wave. The "A" and phase $\theta$ depend on the frequency "f" of the radio wave and the variation of the "A" and phase $\theta$ depends on the delay spread. In the lower frequency than $1/\sigma$ [MHz] where $\sigma$ is the delay spread, the "A" and the phase $\theta$ are almost constant. In the time variation calculator 32, the phase $\theta$ needs to be constant. Therefore, one measurement is better to finish during varying the frequency by $1/\sigma$ [MHz] when the time variation of the frequency is D [MHz/µs]. The delay time Ta is following the expression (6).

$$Ta < \frac{1}{\sigma D\max} \quad (6)$$

The larger delay times Ta, Tb than $1/(\sigma Dmax)$ cause degradation of accuracy in calculating the time variation of the frequency. Therefore, the time variation calculator 32 calculates the time variation of the frequency of the receiving wave with the flip-flops 41a-41c set as above.

Next, we will describe detail of the chirp radar determination unit 33. The chirp radar determination unit 33 determines whether the receiving signal is the chirp wave or not based on the time variation of the frequency from the time variation calculator 32.

If the chirp wave is received, the time variation calculator 32 outputs a constant value except 0 [rad] to the chirp radar determination unit 33. On the other hand, noise or other signal such as OFDM packet is received, the time variation calculator 32 outputs any value selected randomly between 0~2π [rad]. Therefore, the chirp radar determination unit 33 may not be able to determine whether the receiving signal is the chirp wave or not based on the only one time variation from the time variation calculator 32. The chirp radar determination unit 33 obtains the time variations from the time variation calculator 32 several times.

In the case of a waveform having a single frequency such as the pulse radar, the time variation calculator 32 always outputs around 0 [rad]. Therefore, the chirp radar determination unit 33 may need to distinguish noise, OFDM packet, pulse radar, and chirp radar according to the several time variations of the frequency.

Figure 5:
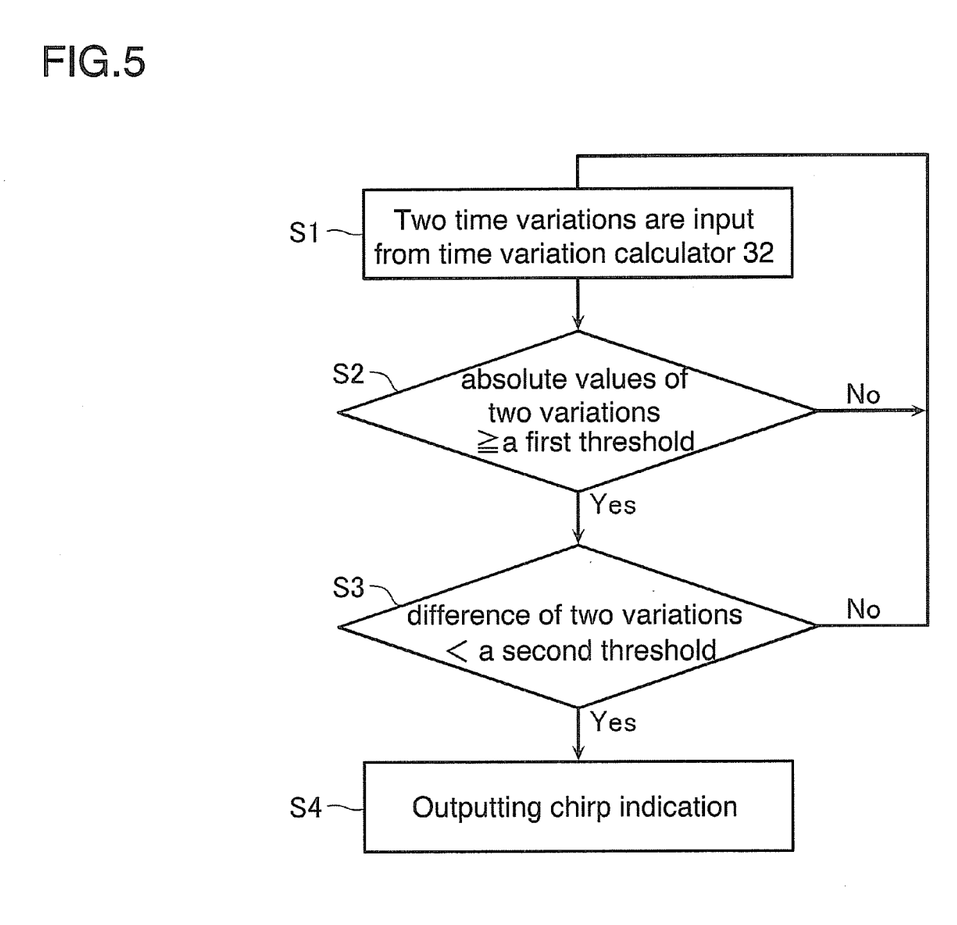
FIG. 5 is a flow chart explaining an operation of the chirp radar detector.

FIG. 5 shows a flowchart of the chirp radar determination unit 33. First, the chirp radar determination unit 33 obtains the two time variations of frequency from the time variation calculator 32 in a step S1. Next, the chirp radar determination unit 33 compares absolute values of the two time variations with a first threshold respectively in a step S2. If the absolute values of the two time variations are larger than the first threshold respectively, the chirp radar determination unit 33 determines that the time variation of the frequency of the receiving radio wave is not 0. This means that the receiving radio wave is not the pulse radar. Then, the chirp radar determination unit 33 compares a difference between the two time variations with a second threshold in the step S3. If the difference between the two time variations is smaller than the second threshold, the chirp radar determination unit 33 determines that the time variation of the frequency is constant. This means that the receiving radio wave is the chirp wave.

If the chirp radar determination unit 33 determines the receiving radio wave is the chirp wave, the chirp radar determination unit 33 outputs the chirp notification from the output terminal 34 in the step S4. The chirp notification is inputted into the frequency band selector 25. If the frequency band selector 25 receives the chirp notification, the frequency band selector 25 tries to switch the channel used for the wireless communications to other channel.

For example, the frequency band selector 25 sends an indication of a channel switching to a destination wireless communication apparatus. Also, the frequency band selector 25 controls the high frequency circuit 21 for the channel switching. Moreover, the frequency band selector 25 controls a timer to abstain from using a channel in which the chirp radar is detected.

According to the first embodiment, the wireless communication apparatus calculates the phase of the receiving radio wave and the time variation of the frequency based on the phase. The chirp wave has the time variation of the frequency of a constant value except 0. This feature does not exist in a packet of the wireless communications and a degraded packet due to distortion of channel and noise. Since the wireless communication apparatus detects the chirp radar based on the time variation, the wireless communication apparatus can reduce mistake of the detection of the chirp radar due to the unknown packet and the degraded packet. Therefore, the wireless communication apparatus can detect the chirp radar more certainly.

Moreover, the chirp radar determination unit 33 in the wireless communication apparatus uses the two time variations of the frequency in order to determine the chirp wave. Accordingly, the chirp radar determination unit 33 achieves small circuit and low power consumption.

Description of the Second Embodiment

In a wireless communication apparatus of the second embodiment, the chirp radar determination unit 33 is different from the wireless communication apparatus of the first embodiment.

Figure 6:
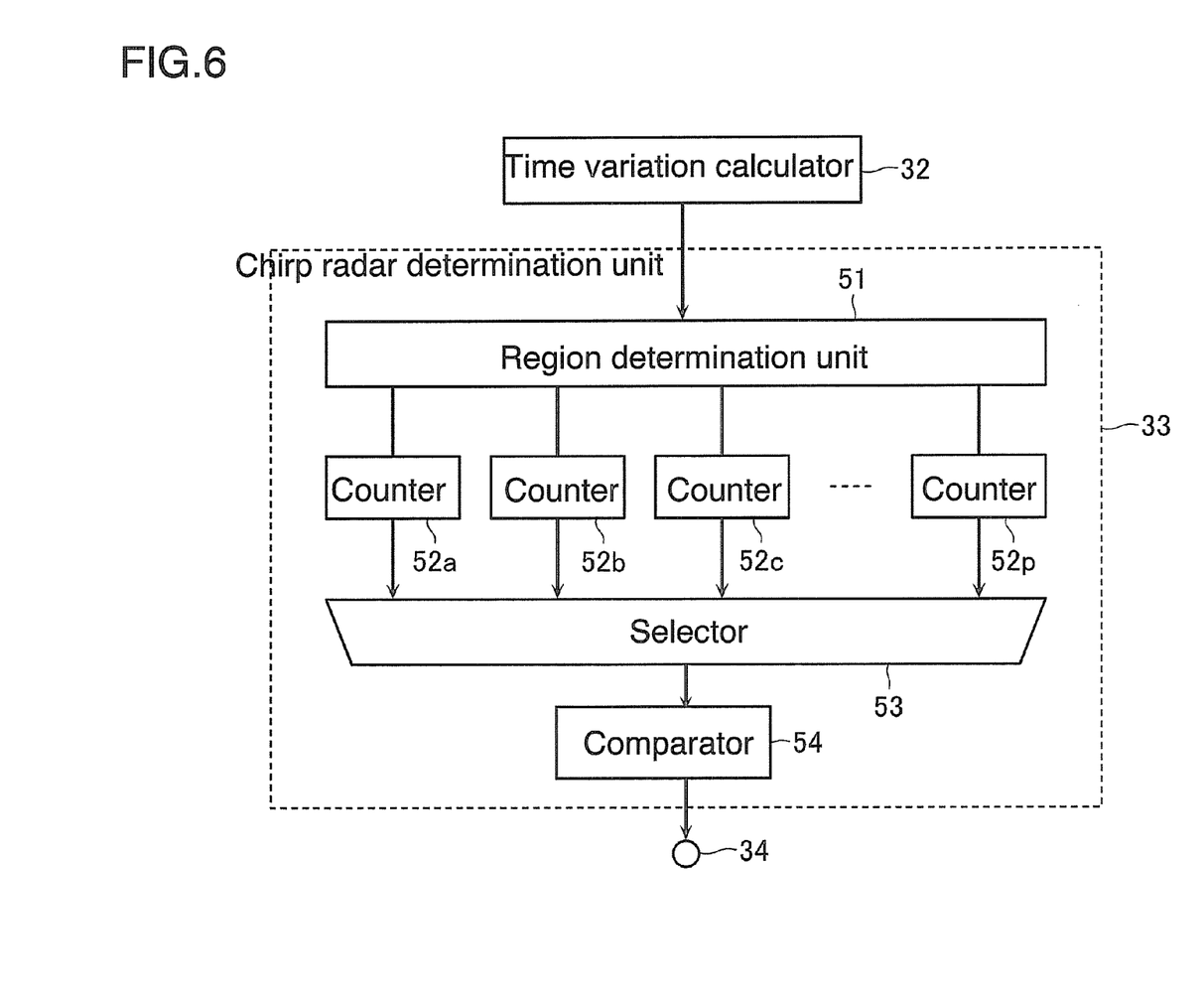
FIG. 6 is a block diagram showing a wireless communication apparatus according to the second embodiment.

As shown in FIG. 6, the chirp radar determination unit 33 of the second embodiment includes a region determination unit 51, counters 52a-52p, a selector 53, and a comparator 54.

The region determination unit 51 and the counters 52a-52p are used to make a histogram based on the time variation from the time variation calculator 32. The region determination unit 51 is connected to each of the counters 52a-52p by lines respectively. The time variation from the time variation calculator 32 is a phase which is equal to or larger than 0 [rad] and less than 2π [rad]. The region determination unit 51 divides range of 0 to 2π [rad] into several equal regions, for example, 16 regions. Number of the counters 52a-52p equals number of the regions (That is "16" in the second embodiment).

The region determination unit 51 determines which region includes the time variation. Then, the region determination unit 51 outputs a signal to one of the counters 52a-52p corresponding to the region including the time variation through the line. The counter counts up according to the signal. After all counters 52a-52p are reset to zero, the chirp radar determination unit 33 starts to count up the counters 52a-52p by receiving the time variations in order to make the histogram.

Next, we will explain the histogram below.

Figure 7:
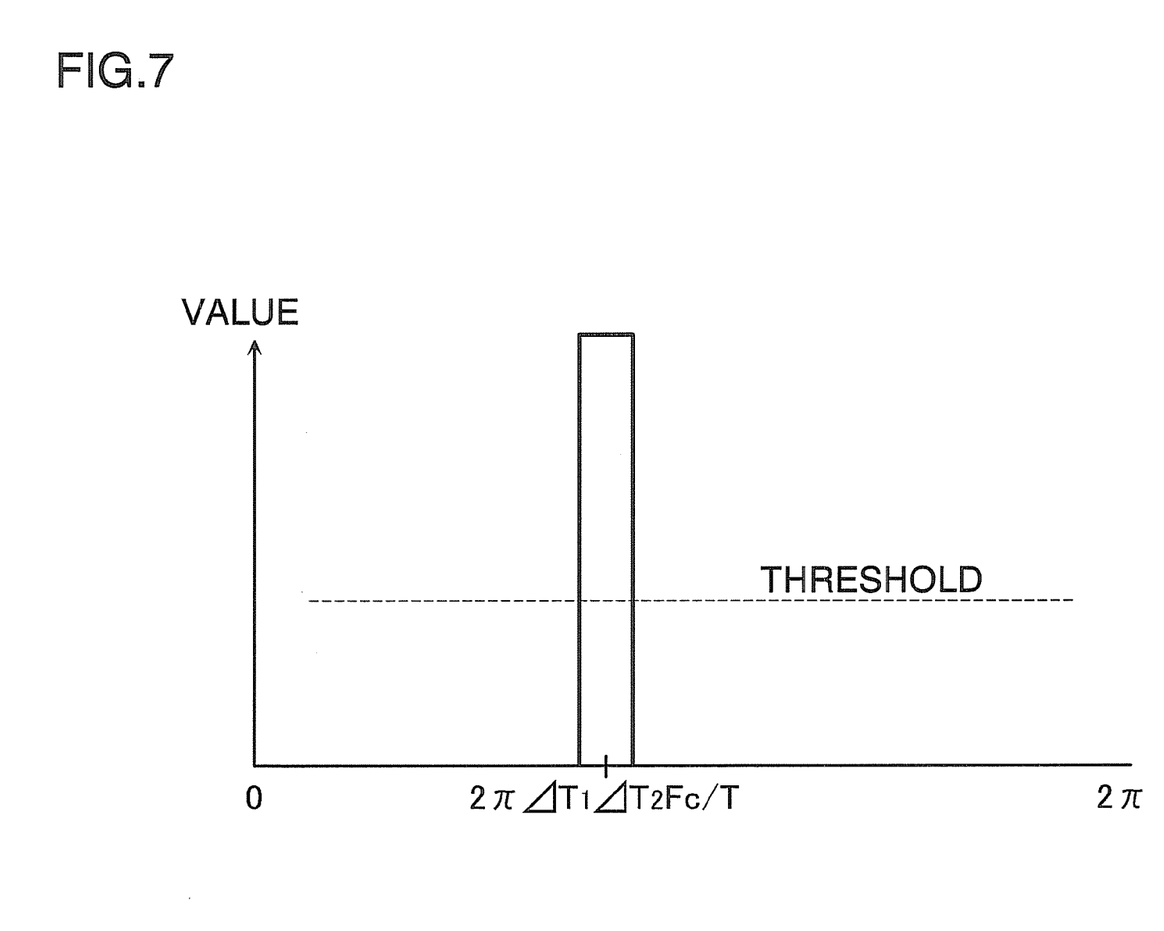
FIG. 7 is a histogram of a time variations of frequency when the wireless communication apparatus receives the chirp radar.

FIG. 7 shows an example of the histogram, when the wireless communication apparatus receives the chirp radar. A chirp width is defined as Fc and a time duration is defined as T. As shown in FIG. 7, the histogram has a peak at a region corresponding to the time variation of the chirp wave Fc/T in an ideal environment with no noise. The time variation may be expressed as $2\pi \Delta T1 \Delta T2 Fc/T$ [rad]. "ΔT1" is the delay times of the flip-flop 41a and the flip-flop 41c. "ΔT2" is sum of the delay times of the flip-flop 41a and the flip-flop 41b. Actually, the peak may have some margin because of noise.

Figure 8:
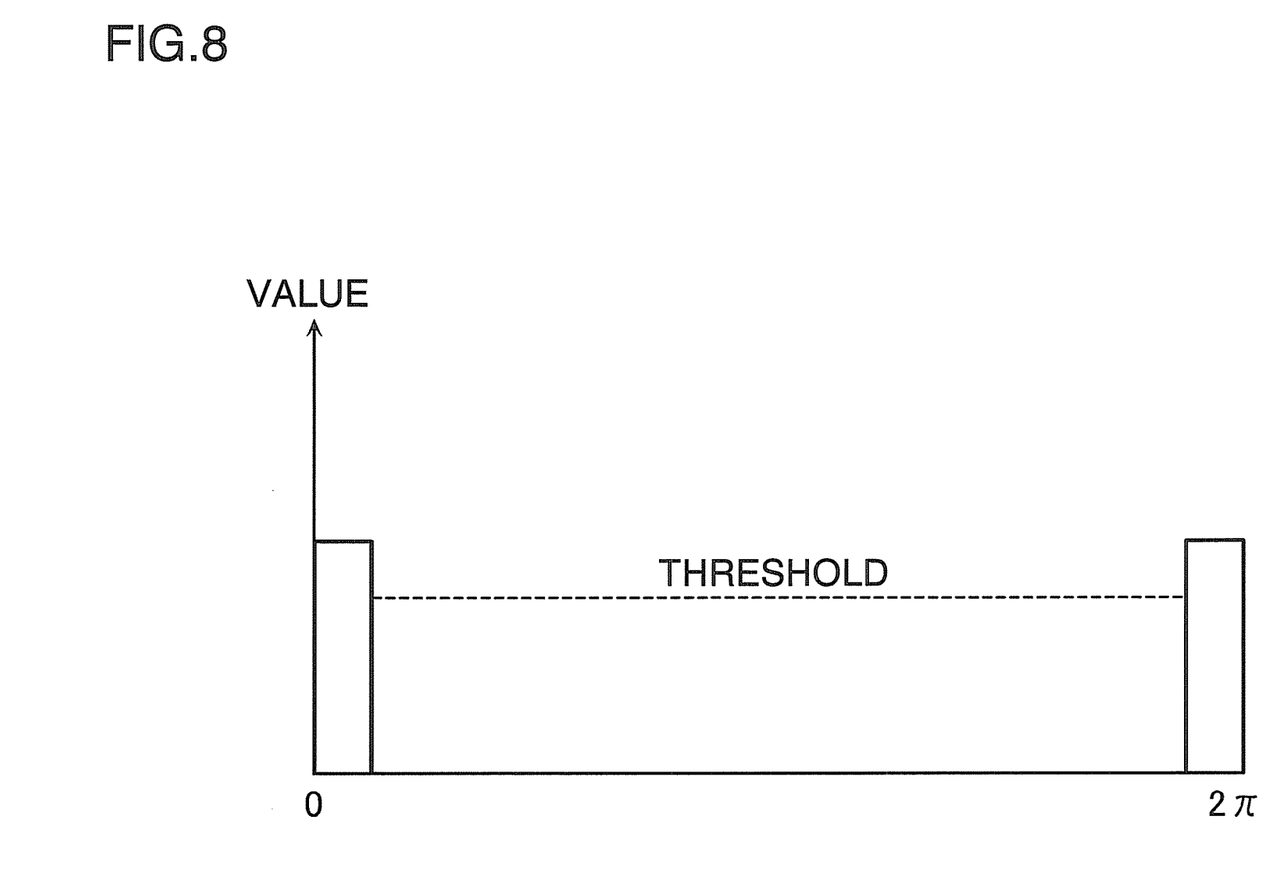
FIG. 8 is other histogram of the time variations of the frequency when the wireless communication apparatus receives a radio wave having a single frequency such as the pulse radar.

FIG. 8 shows other example of the histogram, when the wireless communication apparatus receives a radio wave having a single frequency such as the pulse radar. Since the radio wave having the single frequency does not vary the frequency with passing time, the time variation is always 0 [rad] or 2π [rad]. Therefore, the histogram has the peaks at 0 [rad] and 2π [rad].

Figure 9:
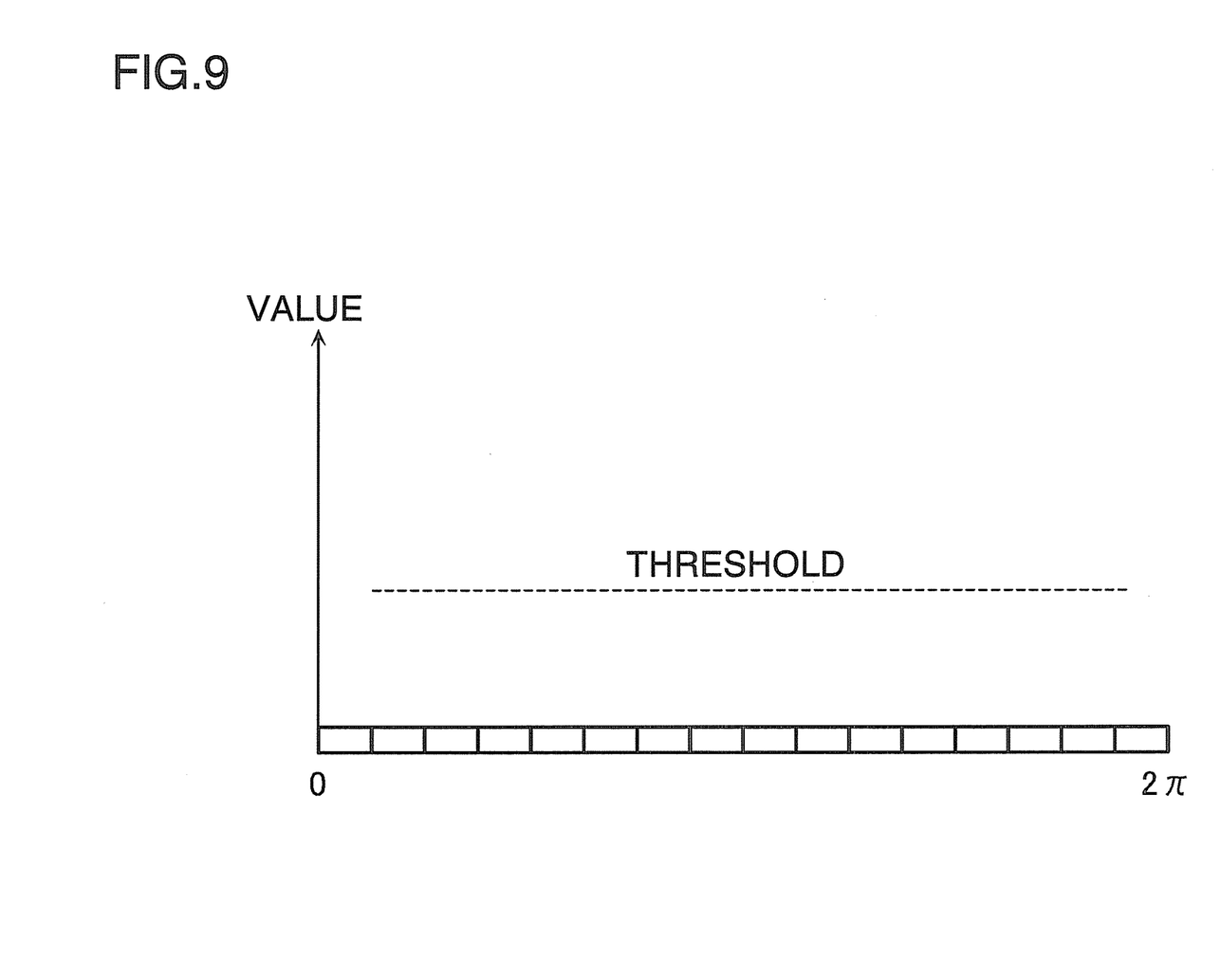
FIG. 9 is other histogram of the time variations of the frequency when the wireless communication apparatus receives noise or an OFDM frame.

FIG. 9 shows other example of the histogram, when the wireless communication apparatus receives noise or an OFDM frame. In these cases, the time variations are distributed almost equally in all regions. Therefore, the histogram has a flat distribution.

According to above histograms, the chirp radar determination unit 33 is possible to determine whether the receiving signal is the chirp wave or not by checking the histogram. If the histogram has a peak at a region which is not 0 [rad] or 2π [rad], the receiving wave is the chirp wave. Specifically, as shown in FIGS. 7-9, the chirp radar determination unit 33 compares each value of each region with a threshold. If a value of one region which is not around 0 [rad] or 2π [rad] is larger than the threshold, the chirp radar determination unit 33 may determine that the receiving wave is the chirp wave.

The threshold may be a larger value than average value of all regions when the receiving wave is the noise or the OFDM packet.

The selector 53 and the comparator 54 perform checking whether the time variation in the histogram is larger than the threshold or not. The region determination unit 51 and the counters 52a-52p obtains the histogram based on the several time variations. Then, the selector 53 outputs a value of each of the counters 52a-52p which is not region of around 0 [rad] or 2π [rad]. The comparator 54 compares the value of each of the counters 52a-52p from the selector 53 with the threshold. If the value of each of the counters 52a-52p from the selector 53 is larger than the threshold, the chirp radar determination unit 33 determines that the radio wave is the chirp wave. Then, the chirp radar determination unit 33 outputs the chirp notification from the output terminal 34.

On the other hand, if the value of each of the counters 52a-52p from the selector 53 is larger than the threshold, the chirp radar determination unit 33 determines that the radio wave is not the chirp wave. Accordingly, the chirp radar determination unit 33 does not output the chirp notification.

According to the second embodiment, the wireless communication apparatus makes the histogram based on plural of the time variations from the time variation calculator 32. Then, the wireless communication apparatus determines whether the receiving radio wave is the chirp wave or not based on the histogram. Accordingly, the wireless communication apparatus can detect the chirp radar more accurately even under the environment with strong noise.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following. For example, the time variation calculator 32 may not be limited as shown in FIG. 4 but may be able to calculate the time variation.

Figure 10:
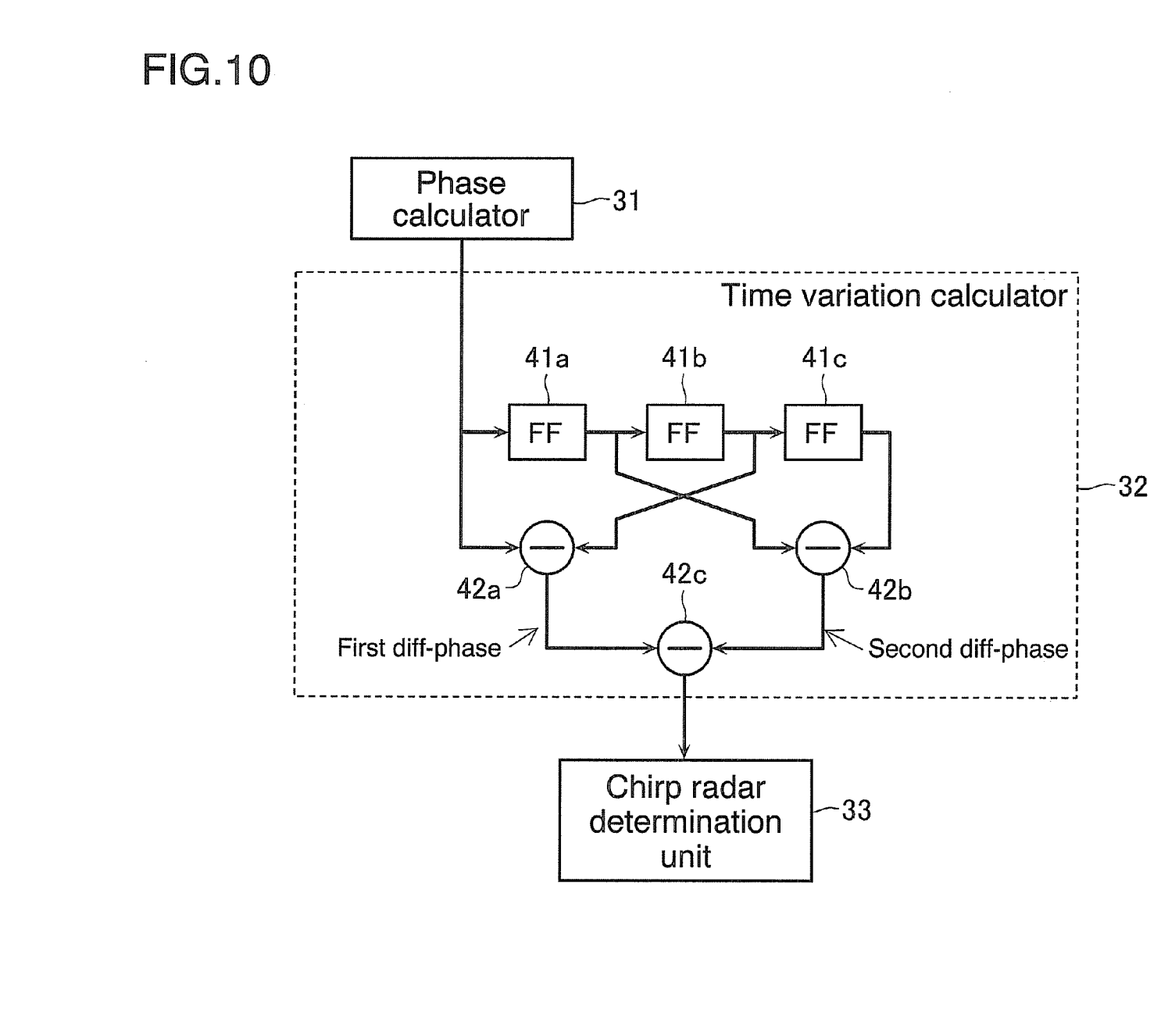
FIG. 10 is a block diagram showing an example of the time variation calculator.

FIG. 10 shows another example of the time variation calculator 32. In FIG. 10, the subtractor 42a subtracts the phase inputted by the flip-flop 41b from the phase inputted by the phase calculator 31 to obtain a first diff-phase. Similarly, the subtractor 42b subtracts the phase inputted by the flip-flop 41a from the phase inputted by the flip-flop 41c to obtain a second diff-phase. The subtractor 42c subtracts the second diff-phase from the first diff-phase. This time variation calculator 32 is mathematically equal to the time variation calculator 32 of the first embodiment shown in FIG. 4.

Figure 11:
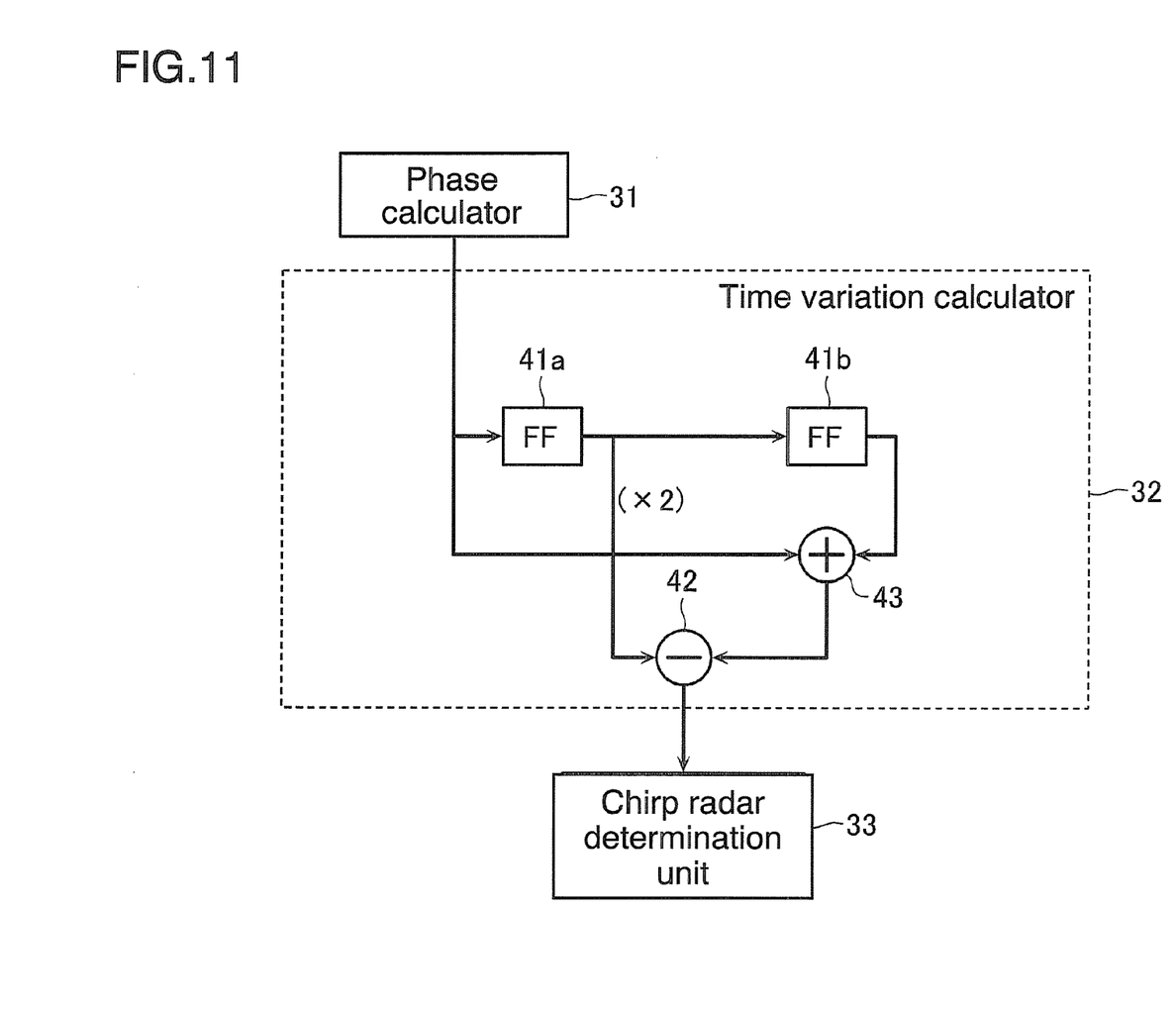
FIG. 11 is a block diagram showing other example of the time variation calculator.

FIG. 11 shows another example of the time variation calculator 32. In FIG. 11, there are only two flip-flops 41a, 41b. The phase from the flip-flop 41a is doubled by the multiplier and input into the subtractor 42. An adder 43 adds the phase from the phase calculator 31 and the phase from the flip-flop 41b. The subtractor 42 subtracts the phase doubled by the flip-flop 41a from the phase outputted by the adder 43. This time variation calculator 32 can also calculate the time variation of the frequency of the receiving radio wave. The time variation calculator 32 in FIG. 11 achieves small circuit by decreasing number of the flip-flops.

What is claimed is:

1. A wireless communication apparatus, comprising:
    an analog receiving unit configured to obtain a receiving signal from a radio wave;
    a phase calculator configured to calculate a phase of the receiving signal;
    a time variation calculator configured to calculate a frequency of the receiving signal based on a time variation of the phase and calculate a time variation of the frequency; and
    a chirp radar determination unit configured to determine whether the receiving signal is a chirp radar based on the time variation of the frequency, wherein the chirp radar determination unit is further configured to generate a histogram of time variations of the frequency calculated by the time variation calculator and determine that the receiving signal is the chirp radar in response to a determination that the histogram has a peak at a time variation of the frequency.

2. The wireless communication apparatus of claim 1, wherein the time variation calculator comprises:
    first to third flip-flops configured to delay the phase sequentially;
    a first subtractor configured to subtract a phase outputted by the first flip-flop or the second flip-flop from a phase inputted to the first flip-flop to obtain a first diff-phase;
    a second subtractor configured to subtract a phase inputted to the third flip-flop or the second flip-flop from a phase outputted by the third flip-flop to obtain a second diff-phase; and
    a third subtractor configured to subtract the second diff-phase from the first diff-phase to obtain a third diff-phase and output the third diff-phase as the time variation.

3. The wireless communication apparatus of claim 1, wherein the chirp radar determination unit is further configured to:
    obtain a plurality of the time variations from the time variation calculator, and
    determine that the receiving signal is the chirp radar in response to a determination that each absolute value of each of the plurality of time variations is larger than a threshold and a difference between the plurality of time variations is smaller than a second threshold.

4. The wireless communication apparatus of claim 2, wherein the chirp radar determination unit is further configured to:
    obtain a plurality of the time variations from the third subtractor, and
    determine that the receiving signal is the chirp radar in response to a determination that each absolute value of each of the plurality of time variations is larger than a threshold and a difference between the plurality of time variations is smaller than a second threshold.

5. The wireless communication apparatus of claim 2, wherein each of the first to third flip-flops has a delay time which is set such that the time variation is not zero in a range of frequency of the chirp radar.

6. The wireless communication apparatus of claim 1, further comprising:
    a frequency band selector configured to switch from a first channel receiving the receiving signal to a second channel that is different than the first channel in response to a determination by the chirp radar determination unit that the receiving signal is the chirp radar.

* * * * *